United States Patent [19]

Thuy

[11] 4,401,927
[45] Aug. 30, 1983

[54] PROCESS AND DEVICE TO CONTROL THE ELECTRIC BRAKING OF A DIRECT CURRENT MOTOR

[75] Inventor: M. N'Guyen U. Thuy, La Verpilliere, France

[73] Assignee: Societe CEM-Compagnie Electromecanique & CIE SNC., Paris, France

[21] Appl. No.: 254,651

[22] Filed: Apr. 16, 1981

[30] Foreign Application Priority Data

Apr. 16, 1980 [FR] France .................. 80 08497

[51] Int. Cl.³ .............................................. H02P 3/14
[52] U.S. Cl. .................................. 318/379; 318/273; 318/139
[58] Field of Search .............. 318/376, 379, 380, 139, 318/757, 759, 297, 299, 290, 296

[56] References Cited

U.S. PATENT DOCUMENTS

| | | |
|---|---|---|
| 3,519,907 | 7/1970 | White et al. .................. 318/297 |
| 3,651,390 | 3/1972 | Videl et al. .................. 318/379 X |
| 3,983,465 | 9/1976 | Tsuboi et al. .................. 318/380 X |
| 4,187,436 | 2/1980 | Etienne .................. 318/139 |
| 4,267,492 | 5/1981 | Manners .................. 318/379 X |

FOREIGN PATENT DOCUMENTS

| | | |
|---|---|---|
| 2050822 | 10/1971 | Fed. Rep. of Germany . |
| 2140906 | 4/1972 | Fed. Rep. of Germany . |
| 2052515 | 6/1970 | France . |
| 2040913 | 1/1971 | France . |

OTHER PUBLICATIONS

The International Dictionary of Physics and Electronics by D. van Nostrand Co., Inc., p. 287.

*Primary Examiner*—B. Dobeck
*Assistant Examiner*—A. Evans
*Attorney, Agent, or Firm*—Burns, Doane, Swecker & Mathis

[57] ABSTRACT

A direct current motor includes a chopper in series with the field coil of the motor to regulate the current flowing through the armature of the motor during electrical braking when the motor functions as a generator to produce current. In addition, a shunting device is connected to the field coil to regulate the current flowing through the coil so that it is maintained at a value less than the armature current.

7 Claims, 5 Drawing Figures

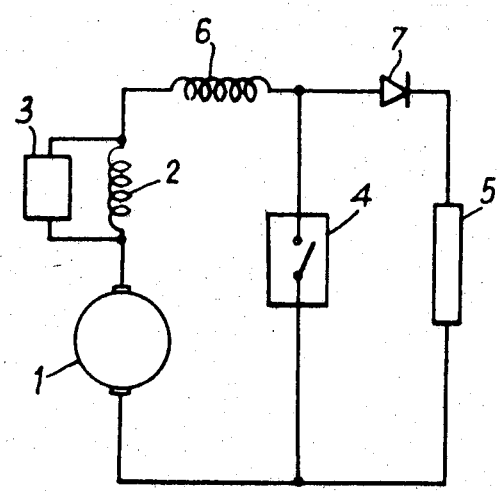
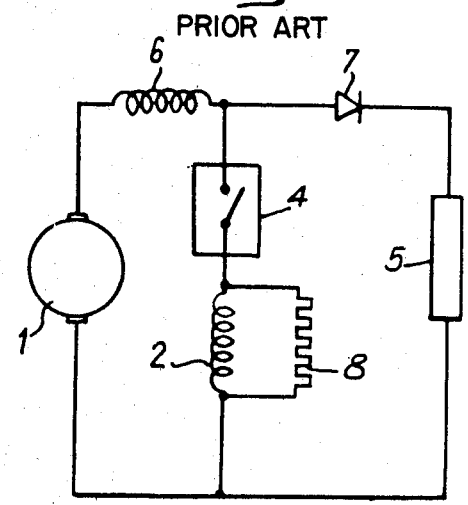
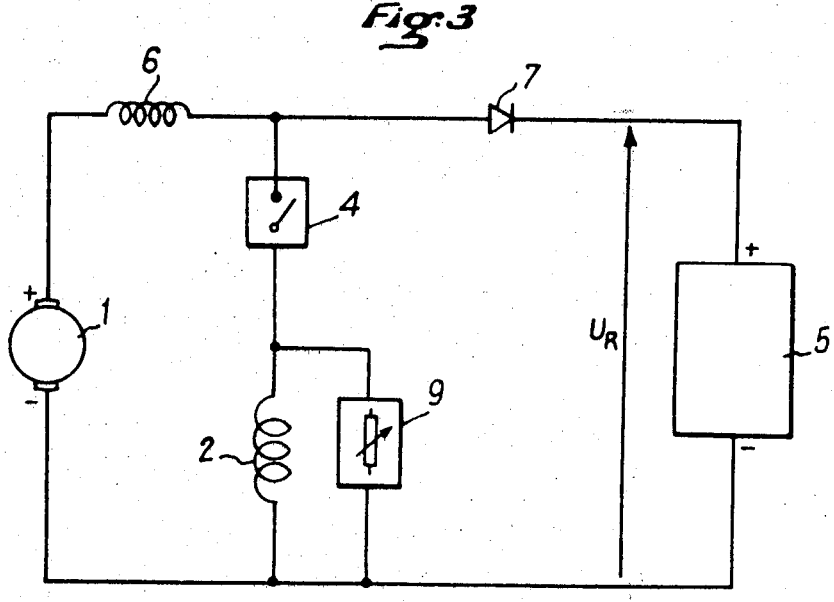

PROCESS AND DEVICE TO CONTROL THE ELECTRIC BRAKING OF A DIRECT CURRENT MOTOR

BACKGROUND OF THE INVENTION

The invention relates to a process and a device for the control of the electric braking of a direct current motor, in particular a traction motor.

The electric braking of traction motors equipped with current chopper controls has been carried out heretofore in two fashions, when it is desired to maintain the braking force at velocities lower than the rating of the traction motor.

In one prior arrangement for achieving electric braking, illustrated in FIG. 1, the inductor and the armature of the motor are in series, wherein the inductor may comprise a variable shunt, and a chopper is mounted in parallel between the load and the motor so as to make control of the load possible, even when—in the special case when the load is a source of power—the voltage or electromotive force of the motor, when it functions as a generator, is less than that of the power source. This layout has disadvantages related to the instability of the generator series excited winding, where an increase in the current in the inductor tends to increase the voltage on the terminals of the assembly.

In another prior arrangement for achieving electric braking, illustrated in FIG. 2, the traction motor functions as a generator, discharging onto the grid or on any particular load. The excitation of this generator is controlled by a chopper-inductor assembly connected in parallel with the terminals of the generator. Such a system permits control of the excitation field of the motor by means of the chopper only. In cases of operation wherein the current in the inductor must be weak compared to the current of the armature, this process becomes difficult to apply, because the chopper must operate at a very low cyclic rate, causing certain instability problems to appear.

One of the objects of the invention is to eliminate the disadvantages of the known devices by providing the electric braking controls of said motors with an increased flexibility.

A further object of the invention is to insure with simple means the control of the electric braking of traction motors both in the case of rheostatic braking and of regenerative braking.

SUMMARY OF THE INVENTION

In accordance with the invention, a process for the electric braking of direct current motors, of the type wherein the inductor and a chopper are mounted in parallel with the armature, between the armature and the load, is characterized in that braking control is effected both by action on the current in the armature by means of a chopper, and by action on the current in the inductor by means of a controlled shunt of said inductor.

A further feature of the invention is a device for the control of the electric braking of direct current motors of the type wherein the inductor and a chopper are mounted in parallel with the armature, between the armature and the load, that comprises a controlled shunt device in parallel with the inductor.

According to further characteristics of the invention, the controlled shunt device may be solid state or electromechanical and its operation may be in a continuous or discontinuous conduction mode.

According to a particular embodiment of the invention, the controlled shunt device comprises a resistance and a thyristor in parallel.

BRIEF DESCRIPTION OF THE DRAWINGS

Further characteristics of the invention shall become apparent from the description hereinafter, presented with reference to the drawing, wherein:

FIG. 1 is a schematic diagram of an electric braking device of a first known type;

FIG. 2 is a schematic diagram of an electric braking device of a second known type;

FIG. 3 is a schematic diagram of a device for electric braking of a direct current motor according to the invention;

DETAILED DESCRIPTION

Figure 4:
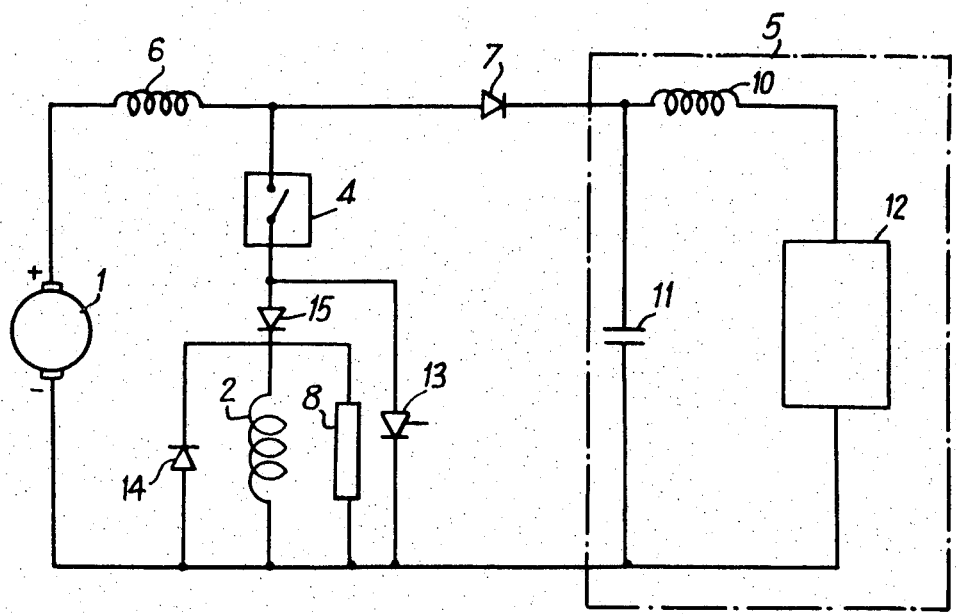
FIG. 4 is a schematic diagram of an embodiment of a device for the control of electric braking according to the invention applied to a case of regenerative braking.

In FIG. 1, the armature of the motor functioning as a generator is designated by 1, the inductor or field coil, by 2, its variable shunting system by 3, a regulator of direct current commonly called a chopper by 4 and a receiver, which may be a load of any kind, or the electric supply system by 5. A coil 6 is intended to store power during the conduction period of the chopper. A blocking diode 7 is necessary if the receiver is an electric source.

In FIG. 2, the references 1, 2 and 4 to 7 designate the same elements as in FIG. 1, and reference 8 represents a fixed resistance placed on the terminals of the inductor 2 to eliminate the alternating component of the current that is due to the operation of the chopper 4. The chopper is in series with said inductor, and the entire assembly is in parallel with the receiver 5 and the armature 1.

FIG. 3 presents a simplified diagram of the device according to the invention. In the diagram, the armature 1 of a direct current generator discharges into a receiver 5 through the coil 6 and the blocking diode 7, when the chopper 4 is open. In parallel with the armature 1 equipped with the coil 6, there are arranged in series the chopper 4 and the inductor 2 of the generator. A shunt block 9 is placed in parallel with the inductor 2 to feed the excitation current into it.

The device operates in the following manner:

When the chopper 4 is open, the armature 1 of the generator discharges into the receiver 5 by virtue of the conduction of the diode 7. The electromotive force E of the generator being lower than the voltage $U_R$ of the receiver 5, the magnetic energy stored in the coil 6 during the preceding phase (conducting phase of the chopper) is liberated to circulate the discharge current.

In the following phase, the chopper 4 is made conducting, the diode 7 blocks and the generator supplies its own inductor circuit 2. The coil 6 is charged with magnetic energy, while the current passing through is rising. If I designates the average current in the inductor 2 and J the induction current supplied by the armature 1, in order to control the induction current at the desired value I (I≦J), the surplus current (J−I) is diverted into the shunt block 9.

The latter may be of an electromechanical type, i.e., comprising contactors and resistances, or solid state, i.e., comprising thyristors or transistors with or without accompanying resistances. Depending on the particular case, the shunting rate may vary continuously or discontinuously.

The mode of operation described hereinabove renders apparent the following essential points:

the electromotive force developed by the armature 1 of the generator is lower than the voltage $U_R$ of the receiver 5;

the chopper 4 thus works as a voltage multiplier;

the surplus current (J−I) passes into the shunt block 9.

The advantage provided by such an arrangement is that there are two control parameters to insure the dynamic performance of electric braking:

the opening angle $\alpha$ of the chopper 4 to control the inductor current I discharged by the generator 1, and the control of the shunt block 9 to regulate the inductor current I (or excitation current).

In FIG. 4, the receiver 5 consists of a filter (coil 10 and capacitor 11) connected with the grid 12 of voltage U, and the shunt device is of the static type. It comprises:

a permanent shunt resistance 8 to divert the undulations of the current and the surplus current (J−I) during the periods when the chopper 4 is closed, i.e., ignited, and the thyristor is still blocked;

a shunting thyristor 13 operating at a cyclic rate of $s<\alpha$, said thyristor having the function of modulating the value of the resistance 8, so that the apparent resistance of the inductor shunt has a variable value depending on the parameter s, a free-wheel diode 14 to drain the magnetic energy stored in the parasitic coils of the wiring and in the coil of the inductor, and a diode 15 connected between the connection of the thyristor 13 with the chopper and the inductor 2, to facilitate the blocking of the thyristor 13 when the chopper 4 is blocked.

The example described relates to the case of regenerative electric braking and here the receiver is the grid 12. In the example the two control parameters are:

the cyclic rate $\alpha$ of the chopper 4 to control the induction current J discharged by the generator 1, and the cyclic rate s of the thyristor 13 to control the inductor current I.

It should be understood that the shunt block 9 may be constituted in another manner (shunting by resistances and contactors, shunting by transistors, etc.). It is thus not limited to the example illustrated in FIG. 4.

Furthermore, the receiver 5 may consist of a resistance and in this case the electric braking is of the rheostatic type. The diode 7 may then be eliminated.

Figure 5:
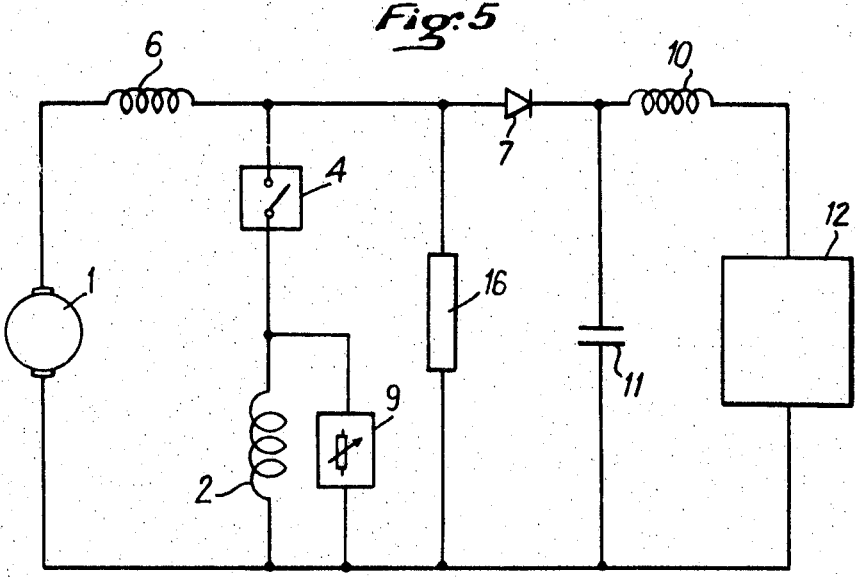
FIG. 5 is a schematic diagram of an embodiment of a device to control electric braking according to the invention applied to a case of rheostatic and regenerative braking.

The case wherein the receiver 5 is a combination of the two preceding types is also not excluded, one then has a combination mode of electric braking: rheostatic and/or regenerative, as shown in FIG. 5, wherein a resistance 16 is provided for rheostatic braking.

With the process according to the invention, the braking control is effected simultaneously and independently by the action on the current in the armature (cyclic rate of the chopper) and by the action on the current in the inductor (cyclic rate of the shunt block).

What is claimed is:

1. In a direct current motor of the type having a field coil and a current chopper connected in parallel with the motor armature between the armature and the load and wherein the field coil is excited by current from the armature when the chopper is closed during braking, a method for controlling the electric braking of the motor comprising the steps of:

providing a shunt device across said field coil;

regulating the current in said armature by means of said chopper; and regulating the current in said field coil by adjusting the flow of current through said shunt device, whereby the braking force of the motor is maintained at a level lower than the rated power of the motor.

2. A direct current motor and a circuit for controlling the electric braking of said motor, comprising:

an armature adapted to be connected across a load;

a series connection of a field coil and a current chopper in parallel with said armature and disposed between the armature and a load such that said field coil is excited by current from said armature when said chopper is closed during braking of the motor; and means connected in parallel with said field coil variably shunting the current passing through said field coil.

3. The motor circuit of claim 2 wherein said shunting means is an electromechanical device that operates discontinuously.

4. The motor circuit of claim 2 wherein said shunting means is a solid-state device.

5. A direct current motor and a circuit for controlling the electric braking of said motor, comprising:

an armature adapted to be connected across a load;

a series connection of an inductor, and a current chopper in parallel with said armature and disposed so as to be between the armature and a load; and means comprising a resistance and a thyristor, each connected in parallel with said inductor, for controllably shunting the current passing through said inductor.

6. The motor circuit of claim 5 further including a free-wheel diode connected in parallel with said inductor.

7. The motor circuit of claim 5 further including a diode connected between the anode of said thyristor and said inductor.

* * * * *